United States Patent [19]

Hurditch et al.

[11] Patent Number: 5,952,073
[45] Date of Patent: Sep. 14, 1999

[54] DYE COMPOSITION FOR OPTICAL RECORDING MEDIA HAVING SELECTED ANIONS

[75] Inventors: Rodney Hurditch, Providence, R.I.; John Griffiths, Garforth, United Kingdom

[73] Assignee: Media Chemical Corp., Trumbull, Conn.

[21] Appl. No.: 08/869,870

[22] Filed: Jun. 2, 1997

Related U.S. Application Data

[63] Continuation-in-part of application No. 08/746,449, Nov. 8, 1996, Pat. No. 5,817,388.

[51] Int. Cl.$^6$ ......................................................... B32B 3/00
[52] U.S. Cl. ........................ 428/64.1; 428/64.2; 428/64.4; 428/64.8; 428/913; 270/270.19; 270/270.2; 270/495.1; 270/945; 369/283; 369/288
[58] Field of Search ................... 428/64.1, 64.2, 428/64.4, 64.8, 913; 430/270.19, 270.2, 495.1, 945; 369/283, 288

[56] References Cited

U.S. PATENT DOCUMENTS

| | | | |
|---|---|---|---|
| 4,656,121 | 4/1987 | Sato et al. | 430/495 |
| 4,923,390 | 5/1990 | Oguchi et al. | 430/270.1 |
| 4,944,967 | 7/1990 | Yabe et al. | 430/270 |
| 4,944,981 | 7/1990 | Oguchi et al. | 428/64 |
| 4,990,388 | 2/1991 | Hamada et al. | 428/64 |
| 4,999,281 | 3/1991 | Inagaki et al. | 430/495.1 |
| 5,080,946 | 1/1992 | Takagisi et al. | 428/64 |
| 5,161,150 | 11/1992 | Namba et al. | 369/275.4 |
| 5,213,955 | 5/1993 | Hamada et al. | 430/276 |
| 5,275,925 | 1/1994 | Mihara et al. | 430/495 |
| 5,316,814 | 5/1994 | Sawada et al. | 428/64 |
| 5,326,679 | 7/1994 | Yanagisawa et al. | 430/495 |
| 5,328,741 | 7/1994 | Yanagisawa et al. | 428/64 |
| 5,328,802 | 7/1994 | Yanagisawa et al. | 430/273 |
| 5,336,584 | 8/1994 | Yanagisawa et al. | 430/273 |
| 5,415,914 | 5/1995 | Arioka et al. | 428/64 |
| 5,482,822 | 1/1996 | Mihara et al. | 430/270.14 |
| 5,605,732 | 2/1997 | Mihara et al. | 428/64.8 |

FOREIGN PATENT DOCUMENTS 353 393 B1   8/1995   European Pat. Off. .

OTHER PUBLICATIONS

K. Naba et al.; "Application of Functional Dyes to Optical Memory Disks"; 1993 Proceedings of International Dye Chemistry Conference; pp. 349–356.

F. Matsui et al.' "An Optical Recording Disk Using An organic Dye Medium In Regard to Provide Interchangeability To The Disks Using Different Organic Dyes", IEEE Translation Journal on Magnetics in Japan; pp. 789–798 (1988).

E. Hamada et al.' "CD–Compatible Write–Once Disc With High Reflectivity", SPIE vol. 1078 Optical Data Storage Topical Meeting, pp. 80–87(1989).

K. Naba et al.; "Development of Lightfast Cyanine Dyes For Recordable CD"; 1993 Proceedings of International Dye Chemistry Conference; pp. 706–713.

*Primary Examiner*—Elizabeth Evans
*Attorney, Agent, or Firm*—William A. Simons; Wiggin & Dana

[57] ABSTRACT

A dye composition for use in optical recording media, comprising at least one cyanine dye having an anion selected from the group consisting of thiocyanate, lactate, hypophosphite, tetracyanonickelate, selenocyanate, trifluromethanesulfonate, ferricyanide, 4-hydroxybutyrate, nitrite, 2-(3',5'-dimethyl-2'-hydroxyphenyl)-2H-benztriazole-4-sulfonate, 1,2-napthoquinone-2-diazide-5-sulfonate and picrate and preferably dissolved in ethyl lactate.

18 Claims, No Drawings

DYE COMPOSITION FOR OPTICAL RECORDING MEDIA HAVING SELECTED ANIONS

CROSS-REFERENCE TO RELATED APPLICATIONS

This application is a continuation-in-part application of U.S. patent application Ser. No. 08/746,449, filed Nov. 8, 1996 now U.S. Pat. No. 817,388 issued Oct. 6, 1998. That parent application is incorporated herein by reference in its entirety.

BACKGROUND OF THE INVENTION

1. Field of the Invention

The present invention concerns recording layer compositions for use in optical recording media, and more particularly, compositions for use in recordable compact disc (CD-R) media and recordable digital video disc (DVD-R) optical media wherein the dye compositions have selected anions for improved solution stability and solubility in preferred coating solvents. The present invention also concerns selected solvents suitable for dissolving and spin-coating the dye components and, optionally, other additives such as stabilizers used for producing the recording layer, as well as substrates coated with such recording layer compositions, and recording systems implementing such recording layer compositions on a recordable medium.

2. Brief Description of Art

Read-Only Memory (ROM) type recording media have been implemented in a variety of fields such as audio recording and information processing. ROM type recording media contain previously recorded information and generally comprise prepits molded into a plastic substrate, a reflective layer comprising a metal such as gold, silver, copper, or aluminum, and a protective layer. ROM recording media are generally offered in the form of compact discs (CDs) which are available for use in audio or computer CD players. However, one drawback to this technology is that these types of recording media have no writable recording layer. This drawback has limited the usefulness of optical storage media.

A strong interest in the development of writable optical recording media has led to several technologies in the optical recording media art. In the so-called "Write Once Read Many" (WORM) recording media, information is recorded in the form of a pit "burned in" by an incident laser beam. Transient temperatures of >1000° C. cause ablation of the recording film and form the resulting pit. Because of the high temperatures attained during the recording process, many different materials including metal films, organic dye films and mixtures of dyes and polymer films may be used as the recording layer. Reproduction of the information stored on the disc is accomplished by irradiating the disc with a laser beam having a weaker output than that for recording. The contrast between the pitted areas and the nonpitted areas on the disc is read as an electrical signal.

CD-Recordable (CD-R) media have also been implemented as an alternative to the WORM technology. Because of their compatibility with existing read-only CD-ROM audio and computer equipment, CD-R media have been favored for many commercial applications. CD-R technology utilizes a layer of organic dye positioned between a substrate, and a reflective layer. In CD-R, the transient temperature rise resulting from absorption of radiation by the incident laser beam is less than that of WORM technology (typically 200–300° C.). Moreover, the resulting dye decomposition in combination with thermal diffusion of the dye and the substrate, as well as deformation of the reflecting layer, causes local changes in the optical properties that are necessary for achieving adequate signal-to-noise ratio (SNR).

In CD-R recording, the laser wavelength is typically in the range of 770–830 nm and the recorded spot size is about 0.80 $\mu$m. A significant improvement in the density of data which can be stored on a disc of the same area may be achieved by reducing the laser wavelength and hence the recorded spot size. In DVD-R recording, the laser wavelength is 630–650 nm and the spot size is about 0.40 $\mu$m. Thus, significant improvements in data density are theoretically possible with DVD-R recordings over CD-R recordings. However, in practice, the wavelengths suitable for these recording and reproduction of optical data storage applications are limited by the availability of reliable, compact lasers and suitable dyes. This is especially true for consumer applications where the lasers must also be low cost, and hence have generally been of the diode type which have a limited selection of output wavelengths. For this reason, recording media must be capable of having adjustments made to the optical properties such as absorbance and reflectivity in order to tune their response to an available laser wavelength.

The dye recording layer of the optical recording medium is formed on a pre-grooved substrate, generally comprising a injection molded disc of polycarbonate. The grooves are present to assist the guiding of the laser beam both on recording and upon subsequent reproduction of the recorded signal. The dye recording layer is deposited by spin-coating from a solution of the dye components in such a manner as to produce a uniform thickness deposited both within the grooves and on the adjacent lands between the grooves. For a typical optical recording medium, the average film thickness of the dye layer over the lands and grooves of the substrate is in the range of 50–160 nm, and for CD-R is typically in the range of 70–130 nm.

The organic dyes useful for optical data applications such as CD-R and DVD-R generally include classes of compounds in which the optical absorption characteristics may be manipulated to achieve the best overall combination of functional characteristics, such as write sensitivity, read stability, solubility in coating solvent, shelf life, and other properties known to those skilled in the art. Such organic dyes also offer low thermal conductivity which results in low heat loss and higher writing sensitivity (reduced laser power) compared with other highly absorbing materials such as metal films. The preferred classes of organic dyes used in the past for many optical data recordings include cyanine dyes, particularly indodicarbocyanines (also referred to as INCY), benzindodicarbocyanines (also referred to as BINCY) and the hybrid indodicarbocyanine-benzindodicarbocyanines (also referred to as INCY-BINCY). Structures of particular examples of each of these classes of organic dyes are shown in formulae (I) to (III), respectively:

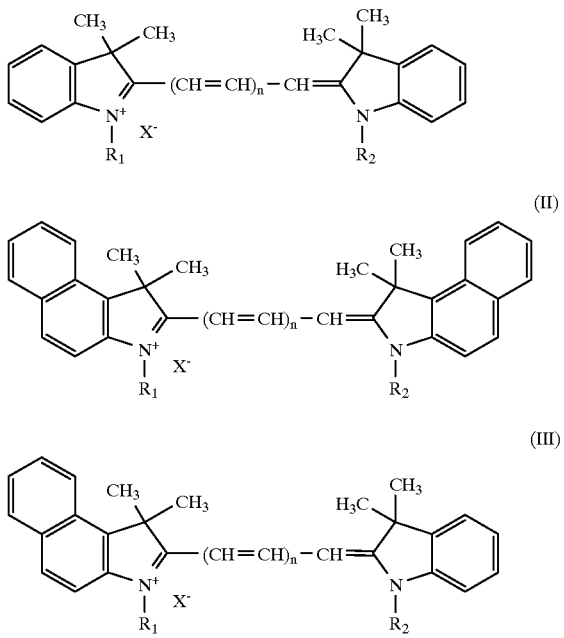

wherein in each formula, X⁻ is a selected counteranion, n is either 1, 2 or 3 and $R_1$ and $R_2$ are alkyl groups having 1–4 carbon atoms for formula (I) and alkyl groups having 1–5 carbon atoms for formulae (II) and (III).

The wavelength region of maximum light absorption in any particular cyanine dye (or the intensity of absorption at a given wavelength) depends on the structure of the organic cation and in particular on the length of the methine chain which joins the indole or benzindole moiety and is defined by n in the above formulae. Thus, by varying n, the wavelength sensitivity to a particular recording laser wavelength may be altered. For CD-R media, having a recording wavelength in the 770–790 nm range, n is typically 2. For DVD-R media having a recording laser wavelength in the range of 630–650 nm, n is typically 1, and for WORM media, for which a higher absorption at the same recording wavelengths is required compared with CD-R or DVD-R media, n is either 2 or 3. In compositions where it is advantageous to finely adjust the optical properties of the dye layer, a mixture of dye components is often preferred, in which each component may have a different value of n. Other advantages of these classes of cyanine dyes in optical data recording applications are the relative ease of synthesis and the acceptable thermal and photochemical stability both in solution and in the solid film.

In the past, the above classes of cyanine dyes employed as an anion (X⁻) either a halide (preferably iodide), a perchlorate, a sulfonate, a toluenesulfonate or a tetrafluoroborate. The iodide and perchlorate counteranions were the most commonly used. The dyes containing these counteranions were chosen for their ease of synthesis and purification.

The majority of patents related to the organic dyes used in CD-R are directed to dye compositions having certain improvements with regard to (1) solubility in coating solvents (also called casting solvents) such as cellosolve, methyl cellosolve, ethyl cellosolve acetate, methylcarbitol, diacetone alcohol, or mixtures thereof with alcohols such as amyl alcohol, heptanol or cyclohexanol; (2) stability against thermal oxidization and photooxidation; (3) reduced dependence of the recording characteristics on wavelength of the laser light (especially in the range 775–830 nm which characterizes the range of wavelengths emitted from GaAs lasers under typical operating conditions); (4) higher recording sensitivity; and (5) higher recording and read-out stability. Typical past improvements include combinations of one or more dyes with stabilizers, often referred to as quenchers. Particularly suitable quenchers which reduce photooxidation have generally been based on transition metal complexes especially those of Ni and Co which may be coordinated to sulfur atoms, and certain types of aromatic tertiary amines capable of forming stable radicals, which are optionally combined with a Ni or Co dithiolato type complex. In U.S. patent application Ser. No. 08/746,449 filed on Nov. 8, 1996 it was shown that the use of a stabilizing dye molecule especially of the amine type, which possesses strong optical absorbance in a wavelength region above the recording wavelength, provides an additional advantage in reducing the wavelength dependence of the dye recording layer.

Also in the past, dye molecules have been modified to improve solubility in spin-coating solvents which do not dissolve the polycarbonate disc substrate material which is widely used for both CD-R and DVD-R media. The number of suitable casting solvents is limited by the number of constraints such as high dye solubility, low rate of attack or swelling of the polycarbonate substrate, relatively high boiling point and medium-fast evaporation rate to achieve uniform coating thickness and high throughput, low toxicity and low cost. Solvents which have met several of these criteria are ethyl cellosolve acetate, diacetone alcohol and tetrafluoropropanol and mixtures often with lower aliphatic alcohols. However, each of these solvents suffers from one or more disadvantage. Ethyl cellosolve acetate, is a member of the family of ethylene glycolethers known to posses an undesirable level of toxicity which may adversely effect mammalian reproductive behavior. Tetrafluoropropanol is expensive, has a limited range of solvency and has a relatively high evaporation rate which makes the spin-coating process more difficult to control. Diacetone alcohol has a tendency to decompose in the presence of oxygen forming peroxides, and can undergo anaerobic decomposition in the presence of other species capable of oxidation. Such reactions reduce the chemical stability of a dye solution comprising diacetone alcohol as the main solvent. Although diacetone alcohol does not dissolve polycarbonate to any significant extent, its solvency is high enough to attack the surface of the disc during spin-coating. Although this improves the adhesion of the dye layer, an excessive amount of attack reduces the integrity the pre-groove features and causes a reduction in the quality and consistency of the recording and reproducing characteristics of the disc. Furthermore, the introduction of traces of polycarbonate and the relatively poor chemical stability of the dye components in the solvent can limit the ability to reuse the portion of solution which is spun off the disc during coating, and restrict the possibility of achieving economical use of the dye. Separately, ethyl lactate is a known safer solvent from a toxicological standpoint, has the desirable physical properties for spin-coating, possesses excellent chemical stability and has other unexpected advantages which are explained below.

Modification of cyanine dyes is generally accomplished by the introduction of solvent compatible substituents onto selected atoms of the parent rings or in some cases the carbocyanine chain (also known as a polymethine chain). These substituents may be alkyl, alkoxy, alkoxyether, halogen, or combinations of substituents. In the case of indocarbocyanine and benzindocarbocyanine dyes, increasing the solubility in selected solvents is usually accomplished by substitution of a moderately hydrophobic lower alkyl group, such as propyl, butyl, or pentyl onto the nitrogen atom of the indole ring. Attempts to improve the solubility in coating solvents by changing the anion, typically to an organic species such as an acetate or toluenesulfonate have also been made. However, in most cases, the increase in solubility is relatively small and the desired solubility in coating solvents could only be obtained by suitable modification of the cyanine dye cation.

Moreover, solutions of cyanine dyes in coating solvents often have a tendency to recrystallize on storage or upon temperature cycling, especially to a temperature range below room temperature, such as upon refrigeration, which is desirable to increase the chemical stability of the solution. Although this problem may be reduced in severity when an asymmetrical cyanine dye of the type shown in formula (III) above is chosen, the problem becomes more severe for solutions having the relatively high concentrations of dye components needed to achieve desirable coating characteristics, and in the presence of relatively large concentrations of stabilizers required to achieve desirable photostability and recording sensitivity.

Thus, the practical use of cyanine dyes for optical data storage media depends upon a large number of factors which influence the selection of dyes, the solvents and added components such as stabilizers. The practical use can be extended by consideration of the dye composition from the following aspects: 1) compatibility with the recording wavelengths, 2) solubility, 3) substrate compatibility, 4) solution stability, 5) safety and 6) cost.

For example, U.S. Pat. No. 5,328,741, assigned to Pioneer Electronic Corp., discloses mixtures of cyanine dyes. In one embodiment, the dyes are a mixture of an indodicarbocyanine-type in which n=2, having a propyl groups attached to both of the indole nitrogen atoms, and a benzindodicarbocyanine-type dye in which n=2, having butyl groups attached to both of the indole nitrogen atoms. The patent further teaches that these specific dyes are readily soluble in a good coating solvent such as diacetone alcohol (DAA). This patent also discloses the use of a specific metal quencher. The disclosed anions for these cyanine dye mixtures are perchlorate, bromide and iodide.

U.S. Pat. No. 5,336,584, assigned to Pioneer Electronic Corp., discloses a composition containing benzindocicarbocyanine-type dye and a nickel tetrathioate quencher. The disclosed anion is perchlorate and the solvent is 2-ethoxyethanol.

U.S. Pat. No. 5,328,802, assigned to Pioneer Electronic Corp., discloses a particular benzindodicarbocyanine-type dye in combination with a nickel tetrathiolate quencher. The disclosed anion is perchlorate.

U.S. Pat. No. 5,155,009, assigned to Pioneer Electronic Corp., discloses a particular indotricarbocyanine-type dye in combination with a nickel tetrathiolate quencher. The disclosed anion is perchlorate and the disclosed solvents are 2-ethoxyethanol, 2-methoxyethanol and cellosolve acetate.

U.S. Pat. No. 5,161,150, assigned to TDK Corp., discloses the use of a dye mixture comprised of different tricarbocyanine and dicarbocyanine dyes. The disclosed anions for these cyanine dyes include perchlorate and toluenesulfonate.

U.S. Pat. No. 5,512,416 assigned to TDK Corp., discloses the use of a recording layer comprising at least one substituted indolene type carbocyanine dye in which the substituents on the indole nitrogen atoms each contain more than four carbon atoms and the methine chain has n=1 to 4. The disclosed anions for these cyanine dyes include perchlorate, tetrafluoroborate, bromide and iodide.

U.S. Pat. No. 5,161,150, assigned to TDK Corp., discloses the use of a dye mixture comprised of different tricarbocyanine and dicarbocyanine dyes. The disclosed anions for these cyanine dyes include perchlorate and toluenesulfonate.

U.S. Pat. No. 5,213,955, assigned to Taiyo Yuden Co., Ltd., discloses the use of a thick recording dye layer for CD-R comprising at least one substituted indolenedicarbocyanine dye. The disclosed anions for these cyanine dyes include halide, perchlorate, fluoroborate, benzenesulfonate, toluenesulfonate, alkylsulfonate, benzenecarboxylate, alkylcarboxylate and trifluoromethylcarboxylate. The claim in this patent is limited to a specific range of average film thickness estimated to be between 180 and 480 nm and outside the normal range used for the production CD-R and DVD-R media.

U.S. Pat. No. 5,316,184, assigned to Fuji Photo Film, discloses the use of substituted indolene type carbocyanine dyes having a hexafluorophosphate anion.

U.S. Pat. No. 4,600,625, assigned to Ricoh Company Ltd., discloses the use of a thin film recording layer free of a metal reflecting layer containing a substituted indolenecarbocyanine dye in which the methine chain has n=1–3. The disclosed anions for these cyanine dyes include halide, perhalogenate, tetrafluoroborate, benzenesulfonate, toluenesulfonate, alkylsulfonate. The disclosed solvents for these cyanine dyes are dichloroethane and ethyl alcohol, the former being used on a glass substrate only.

U.S. Pat. No. 5,316,814, assigned to Ricoh Company Ltd., discloses the use of solvent mixtures of tetrafluoropropanol with 2-methoxyethanol for casting a benzindodicarbocyanine-type dye.

U.S. Pat. No. 4,944,967, assigned to Fuji Photo Film, discloses the use of diacetone alcohol (DAA) as a casting solvent.

Despite these modifications, however, the solubility and/ or the solution stability of the dye formulations in preferred coating solvents such as DAA and especially ethyl lactate may be inadequate to achieve the higher concentrations (typically >8 wt % of solids in solution) desirable for high coating uniformity and reduced cycle time for an efficient coating process. Furthermore, the stability of the solutions may be too poor to permit economical recycling of the dye which is not consumed during the spin coating process.

An advantage of the present invention is the improved solubility and greater solution stability of cyanine dyes and formulations of cyanine dyes with combinations of stabilizers, which makes possible the use of a coating solvent such as ethyl lactate having excellent film forming characteristics, reduced toxicity and high solution stability, as well as excellent compatibility with a polycarbonate substrate. A further advantage of the present invention is that other solvents such as DAA, ethyl lactate and various blends of these solvents with alcohols and buytl lactate for example, may also be used, in which sufficiently high dye concentrations can be achieved to reduce the cycle time of the spin coating process and achieve excellent uniformity of the coated film across the whole area of the substrate upon which the dye layer is deposited by spin coating. These advantages are achieved by combining a cyanine dye cation with selected anions, each of whose sodium salt exhibits good solubility in a lower alkyl alcohol.

BRIEF SUMMARY OF THE INVENTION

Accordingly, one aspect of the present invention is directed to a dye composition useful for forming an optical information recording layer that is suitable for recording and readout with laser beams, which comprises at least one compound consisting of a cyanine dye cation and a counteranion selected from the group consisting of thiocyanate, lactate, hypophosphite, tetracyanonickelate, selenocyanate, trifluoromethanesulfonate, ferricyanide, 4-hydroxybutyrate, nitrite, 2-(3',5'-dimethyl-2'-hydroxyphenyl)-2H-benztriazole-4-sulfonate, 1,2-napthoquinone-2-diazide-5-sulfonate and picrate.

Another aspect of the invention is directed to a recordable medium comprising (a) a protective layer; (b) a reflective layer in proximity to the protective layer; (c) a recording layer in proximity to the reflective layer and forming an optical interface with the reflective layer, the recording layer comprising the above-noted dye composition; and (d) a transparent substrate on which the recording layer is formed.

Yet another aspect of the present invention is directed to a recording system utilizing the above recordable medium.

Still another aspect of the present invention is directed to a dye composition useful for forming an optical information recording layer suitable for recording and readout with laser beams, comprising at least one cyanine dye and wherein said dye composition is dissolved in ethyl lactate.

DETAILED DESCRIPTION OF PREFERRED EMBODIMENTS OF THE PRESENT INVENTION

One preferred embodiment of the present invention is a CD-R dye composition that is based on the cyanine dyes having the above-noted selected anions. The optical recording medium of the invention is an optical recording disc having this particular type of dye as a recording layer and a reflective layer deposited thereon. The optical recording disc is capable of reproduction in accordance with the CD-Standard as set forth in Philips Sony Orange Book (CD-R Standards version 2.0, published by Philips Consumer Electronics BV, November, 1994). Another preferred embodiment of the present invention is a DVD-R dye composition that is based on cyanine dyes having the above-noted selected anions. Only cyanine dyes that are useful in forming an optical information recording layer that is suitable for both recording and readout with laser beams, such as used in CD-R and DVD-R applications, are encompassed within the scope of this invention.

The preferred substrate for the dye-containing recording layer is formed from a resin material (i.e., injection molded polycarbonate) which is substantially transparent to visible and near infrared light produced by a semiconductor laser. A spiral tracking groove (often referred to as the pregroove) is formed on the surface of the substrate where the recording layer is formed during the molding process. Typically the groove has a depth of 100–250 nm and a width of 0.3 to 1 $\mu$m. Adjacent groove tracks are separated by a land portion and the combined width of land and groove (defined as the pitch) is typically about 1.6 $\mu$m for CD-R media and 0.80 $\mu$m for DVD-R media.

The recording layer is applied on the grooved substrate using the above-noted cyanine dyes alone or optionally with compatible stabilizers which, in the case of certain long wavelength absorbing non-cyanine dyes like aminium dyes, can impart increased photostability combined with reduced dependence on the dye layer absorption on the recording and reproducing wavelengths.

The preferred cyanine dyes are represented by formula (IV):

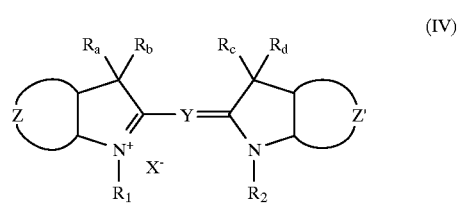

(IV)

wherein $X^-$ is as defined above and $R_1$ and $R_2$ are individually selected from alkyl groups having 1–5 carbon atoms and Z and Z' are independently selected from radicals capable of forming an unsubstituted or substituted aromatic moiety and Y is a polymethine bridge having an odd number of CH units and $R_a$, $R_b$, $R_c$ and $R_d$ are individually selected from alkyl groups having 1–4 carbon atoms. Formulae (I), (II) and (III) above may be modified to change one or both of the gem-dimethyl groups in each formula to other combinations of lower alkyls as defined by $R_a$ to $R_d$.

The preferred cations of the present invention are those based on the indole and benzindolecarbocyanines shown in formulae I, II and III above, in which n, the number of o methine groups in the polymethine chain joining the indole moieties can vary from 1 to 3, and the preferred substituents $R_1$ and $R_2$ are individually selected from lower alkyl groups having from 1 to 5 carbon atoms being present on the nitrogen atom of the indole ring. These dyes are selected on account of their excellent chemical and photochemical stability.

The anions of the present invention comprise selected stable anions of weak acids, the sodium salts of which exhibit good solubility in ethanol and are shown in the following Table 1.

TABLE 1

| NAME OF ANION | STRUCTURE |
|---|---|
| THIOCYANATE | $SCN^-$ |
| LACTATE | $CH_3CH(OH)COO^-$ |
| HYPOPHOSPHITE | $H_2PO_2^-$ |
| TETRACYANONICKLATE | $Ni(CN)_4^{2-}$ |
| TRIFLUOROMETHANESULFONATE | $CF_3SO_3^-$ |
| FERRICYANIDE | $Fe(CN)_6^{3-}$ |
| 4-HYDROXYBUTYRATE | $HO(CH_2)_3COO^-$ |
| SELENOCYANATE | $SeCN^-$ |
| NITRITE | $NO_2^-$ |
| 2-(3',5'-DIMETHYL-2'-HYDROXYPHENYL)-2H-BENZTRIAZOLE-4-SULFONATE | SEE FORMULA VI |
| 1,2-NAPHTHOQUINONE-2-DIAZIDE-5-SULFONATE | SEE FORMULA V |
| PICRATE | $(NO_2)_3C_6H_2O^-$ |

The anions of formula (V) and (VI) are shown as follows:

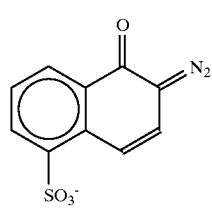

(V)

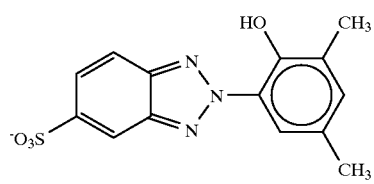

One preferred dye mixture comprises a cyanine dye and an aminium dye. The preferred cyanine dye is selected from the cyanine dyes shown in formulae I, II and III wherein the anion ($X^-$) is selected from thiocyanate, ferricyanide, lactate, tetracyanonickelate or 2-(3',5'-dimethyl-2'-hydroxyphenyl)-2H-benztriazole-4-sulfonate and wherein $R_1$ and $R_2$ are individually selected from propyl or butyl. The preferred aminium dye is selected from those shown in formulae (VII) and (VIII) below:

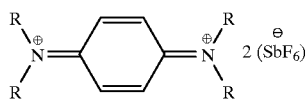

where R=

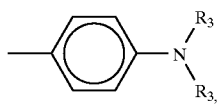

wherein $R_3$ is an alkyl group having 3 to 5 carbon atoms;

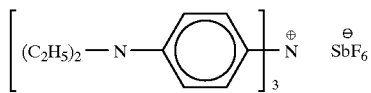

Preferably the cyanine dye or dyes of the present invention are 100–30% by weight of total solid components, preferably in an amount of 90–60% by weight, when mixtures of a cyanine dye and an aminium dye are used. If used, the amount of aminium dye or dyes may preferably vary from about 5% to about 40%, more preferably, from about 10% to about 35% by weight of said mixtures.

Other preferred mixtures may also comprise one or more organic cyanine dyes in combination with an aminium dye and a quencher such as a nickel compound, said cyanine dye or dyes being selected from those shown in formulae I, II and III differing in respect to their absorption coefficients at the recording wavelengths, such that the combination in an appropriate ratio produces desirable recording and replay characteristics for a given substrate pregroove depth and film thickness, which is found to provide the widest process window and yield in manufacturing and can be fine-tuned for a particular laser wavelength by adjusting the ratio of the cyanine dye components.

The nickel quencher stabilizer that may be optionally added to the light absorbing dye mixture to further enhance the stability of the recording medium to heat, moisture and light is preferably a multifunctional nickel stabilizer capable of acting as a singlet oxygen quencher, as well as a deactivator of peroxy, hydroperoxy or alkoxy radicals. Nickel complexes such as bis(dithiolato), thiocatechol, thiobisphenolate or dithiolato types are particularly preferred classes of quenchers. One of the most preferred quenchers is nickel dibutyl dithiocarbamate shown in formula IX.

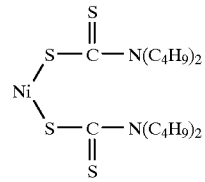

If used, the nickel stabilizer may be added in an amount of about 1 to 25% by weight, and preferably 5–15% to total mixtures.

The recording layer has an index of refraction n (the real part of the complex index of refraction) of about 2 to 3 at the wavelength of the recording and reading light. A high value of n is required to provide adequate signal modulation on recording, and results from the combination of the high absorption coefficients and broad absorption bands of the selected dyes in the wavelength regions defined above, and the compatibility of the dye components of the mixture in the solid film form.

The recording layer is formed by dissolving the dye mixture together with any additional nickel stabilizer in a coating solvent at a concentration in the range 2–10% by weight of the total solid components in the solution. Prior to application in the spin coater, the solution is filtered through an inert filter material such as TEFLON (tetrafluoroethylene polymer) with a pore size of about 0.2 μm to remove particulate matter which might otherwise result in coating defects. The dyes and other components of the mixture must be sufficiently purified so that impurities having poor solubility in the coating solvent do not precipitate as the solvent is removed during the coating process. Suitable solvents or solvent mixtures must not dissolve the substrate material and yet have good solvency for the dye components. Suitable solvents usually have a balance between polarity and hydrogen bonding activity, having either keto, alkoxy, hydroxy, ether or ester functionality, and may combine more than one function or may be a mixture of two or more solvents. Typical solvents for use with the dye mixtures of the present invention comprise diacetone alcohol, cellosolve acetate, ethyl lactate, and tetrafluoropropanol which may be used singly or in combination. Additional cosolvents which may be added to the above solvents to improve the spin coating characteristics and/or further modify the solvency characteristics include hexanol, butanol, cyclohexanol, isoamyl alcohol, butyl lactate, butyl acetate, ethyl-3-ethoxypropionate, and propylene glycol monomethyl ether. Other examples of solvents which can be blended with the above solvents to achieve a desirable balance of solubility and coating characteristics include cyclohexanone, amyl acetate, methyl amyl ketone, anisole and propylene glycol monomethyl ether acetate. A solvent composition comprising at least a majority component (i.e., 50% by weight) ethyl lactate is preferred for the reasons stated above.

As minor components, polymer binders such as polyalkylacrylates, polyvinylacetates, polyamides, polyvinylcarbazoles or polycarbonates may be added to increase solution viscosity or improve film forming characteristics. Surfactants or leveling agents may also be added to improve coating uniformity.

Preferably the recording layer thus formed has a film thickness of about 50 to 200 nm, although the exact thickness is chosen by those skilled in the art to correspond to a range in which the reflectivity is relatively high so that required signal-to-noise for the particular application can be achieved. Reflectivity exhibits strong nonlinear dependence on the film thickness due to the thin film interference effect, and depends also on the substrate pregroove dimensions due to the optical phase difference between the land and the groove.

After spin coating, the dye layer may be optionally dried to further remove residual solvent and improve uniformity of the recording characteristics.

A metallic reflective layer is deposited on the dye layer which may comprise one or more metals having high reflectivity in the range of the recording and reproduction wavelengths for the particular application and having acceptable stability to heat, moisture, light, and oxygen. Metals or alloys may be selected from the group consisting of aluminum, platinum, copper, silver or gold. In the case of alloys, high reflectivity is available in which silver or gold is present in an amount of at least 60%. Gold is often preferred because of its high chemical stability and reflectivity.

The metallic layer is formed typically by sputtering or other method known in the art. The thickness is preferably in the range 30–100 nm depending on the metal deposited.

A protective coat is formed on the surface of the metallic reflective layer and comprises a radiation curable resin, preferably of the UV curable type, which can be deposited as a liquid. The protective coat is formed by spin coating to produce a uniform layer of about 1 to 15 $\mu$m, preferably in the range 3–10 $\mu$m. Examples of radiation curable resins are monomers, oligomers, and polymers having di- or tri- functional groups capable of crosslinking on exposure to radiation. Suitable compositions include acryl functionalized monomers such as ethylacrylate, ethylene or diethylene glycol acrylates, hexane glycol arylates and methacrylates of pentaerythritol and trimethylpropane, and acryl modified elastomers of urethanes as well as other oligoester acrylates, caprolactones and modified urethanes incorporating functional groups such as carboxylic acid. Radiation curable resins based on modified thermoplastics having a UV curable functional group attached to the polymer chain including acrylate, allyl, vinyl or maleic groups may also be used. Examples of the thermoplastic resins include polyesters, polyamides, and polyimides. For UV curing, photopolymerization initiators or sensitizers are added to the radiation curable compositions.

The UV curable resin is designed to provide fast UV curability, low shrinkage, sufficient hardness and chemical resistance, especially to components used in the formulation of screen printing inks used to form a label on the protective layer.

CD-R recording may be carried out on the optical recording medium using a variety of equipment designed to meet the specifications given in Sony-Philips Orange Book. In such equipment a beam of recording light having a wavelength of 780 nm for example is focused in the pregroove through the back of the substrate to form a recorded spot having a lower reflectivity than the surrounding unexposed region. The spot is detected in the reproduction process by means of a lower power laser beam which is reflected by the reflective layer through the substrate to a photodetector. During recording and reproduction, the substrate (disc) is rotated at a tangential velocity of 1.2 meters per sec or higher. The recording mechanism is described in the background to this invention.

DVD-R recording may be carried in substantially the same manner except that the recording light has a lower wavelength of 635 nm for example, and during recording and reproduction, the substrate (disc) is rotated at a tangential velocity of 3.8 meters per sec or higher. The disc medium may optionally comprise a single recording layer (one-sided) or a double recording layer (two-sided). The recording mechanism is essentially the same as for CD-R recording and is described in the background to this invention.

The present invention is further described in detail by means of the following Examples. All parts and percentages are by weight and all temperatures are in degrees Celsius, unless explicitly stated otherwise.

SYNTHETIC EXAMPLES D1-D17

With the exception of Example D4 above, cyanine and related cationic dyes of the general formula Dye$^+$X$^-$ (wherein the counter-anions X$^-$ confer beneficial solubility and/or stability properties) were prepared from a dye salt having a different counter-anion (Dye$^+$Y$^-$) by two general methods. Method I involves a counter-anion interchange in an aqueous medium. Method II involves the formation of leuco-sulfide derivative and reaction of that derivative with an acid.

In Method I, a dye salt of general formula Dye$^+$Y$^-$ is mixed with a water soluble inorganic salt of the general formula M$^+$X$^-$ to establish an equilibrium between Dye$^+$Y$^-$+M$^+$X$^-$ and Dye$^+$X$^-$+ M$^+$Y$^-$ wherein M$^+$is a metal or an ammonium cation and Y$^-$ and X$^-$ are anions chosen such that the dye salt Dye$^+$X$^-$ may be isolated from the equilibrium system because of either its lower solubility in water than the dye salt Dye$^+$Y$^-$ or its higher solubility in an organic extraction solvent than dye salt Dye$^+$Y$^-$. It should be noted that both the cations and anions of the metal salts M$^+$X$^-$ and M$^+$Y$^-$ may have valances of either 1, 2 or 3 and are not limited to only monovalent species. The following Example D1 shows three variations of this Method I.

Method II involves a two-step reaction sequence. In step 1, a dye salt D$^+$Y$^-$ and a metal or ammonium sulfide salt M$^{n+}_2$S$^{2-}_n$ are reacted together to form a colorless water-insoluble leuco-sulfide dye where Y$^-$ is an anion and M$^{n+}$ is a metal or a ammonium cation. For step 2, the colorless leuco-sulfide dye is isolated and then reacted with an acid H-X to produce the desired dye salt (Dye$^+$X$^-$) according to the following chemical equation:

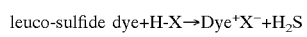

leuco-sulfide dye+H-X→Dye$^+$X$^-$+H$_2$S wherein H-X is an acid having the desired counter-anion X$^-$. The following Synthetic Examples D2 and D3 show two variations of this Method II.

The synthetic examples are listed in Table 2. A detailed description of the preparation is as follows:

SYNTHETIC EXAMPLE D1

A cyanine dye of formula (III) wherein R$_1$=n—C$_4$H$_9$, R$_2$=n—C$_3$H$_7$, n=2, and X$^-$ is SCN$^-$, was prepared by three different counter-anion interchange methods:

METHOD IA (Method I, first variation):

Solution A. A saturated solution (150 ml) of sodium thiocyanate was prepared at 25° C. and then maintained at 80° C. with stirring.

Solution B. The cyanine dye perchlorate salt (1.6 g) was dissolved in a mixture of methanol (110 ml) and distilled water (40 ml) with heating, and was then maintained at 80° C.

Solution B was added to Solution A rapidly, with stirring, and the mixture was heated at 80° C. for 1 hour. Heating was then stopped and the mixture allowed to cool naturally to room temperature with stirring over 15 hours. The precipitated thiocyanate dye salt was filtered off, washed with 4×50 ml distilled water and dried in an oven at 50° C.

The yield of dye was 1.4 g. The presence of the cyanine dye chromophore in the product was confirmed by visible absorption spectroscopy, when the spectrum showed a visible absorption band with identical characteristics ($\lambda_{max}$, half-bandwidth and band profile) to those of the original dye perchlorate. A solution in dichloromethane gave a peak wavelength absorbance, $\lambda_{max}$=672 nm and an extinction coefficient, $\epsilon_{max}$=200,000 1 mol$^{-1}$cm$^{-1}$.

METHOD IB (Method I, second variation):

The cyanine dye perchlorate salt (1.0 g) and sodium thiocyanate (20 g) were stirred together in dimethylformamide (20 ml) at 80° C. for 2 hours. Distilled water (40 ml) was added and the mixture stirred at room temperature for 12 hours. The precipitated cyanine dye thiocyanate was filtered off, washed with 2–100 ml distilled water and dried in an oven at 50° C. The yield of the dye was 0.9 g.

The presence of the cyanine dye chromophore in the product was confirmed by visible absorption spectroscopy, when the spectrum showed a visible absorption band with identical characteristics ($\lambda_{max}$, half-bandwidth and band profile) to those of the original dye perchlorate. A solution in dichloromethane gave a peak wavelength absorbance, $\lambda_{max}$32 672 nm and an extinction coefficient, $\epsilon_{max}$=240,000 1 mol$^{-1}$cm$^{-1}$.

METHOD IC (Method I, third variation ):

This followed METHOD IB, but using the iodide salt of the cyanine dye rather than the perchlorate salt. The yield of the dye was 0.8 g. A solution in dichloromethane gave a peak wavelength absorbance, $\lambda_{max}$=672 nm and an extinction coefficient, $\epsilon_{max}$=268,000 1 mol$^{-1}$cm$^{-1}$.

The presence of the cyanine dye chromophore in the product was confirmed by visible absorption spectroscopy, when the spectrum showed a visible absorption band with identical characteristics ($\lambda_{max}$, half-bandwidth and band profile) to those of the iodide and perchlorate.

The solid dye salt showed the absence of chlorine by EDX and the presence of sulfur due to the thiocyanate anion. Fourier Transform Infrared (FTIR) spectroscopy showed an intense peak at 2056 cm$^{-1}$ characteristic of the thiocyanate anion. DSC analysis showed a sharp endotherm at 164.50° C. in addition to other peaks.

SYNTHETIC EXAMPLE D2

A cyanine dye of formula (III) wherein $R_1$=n—$C_4H_9$, $R_2$=n—$C_3H_7$,n=2, and X$^-$ is lactate ($CH_3CHOHCO_2$) was prepared by a variation of the method involving formation of a leuco-sulfide derivative and reaction of this with an acid.

METHOD IIA (Method II, first variation):

Step (i): The cyanine dye perchlorate salt (10 g) was dissolved in a mixture of methanol (700 ml) and distilled water (200 ml) and heated with stirring at 60° C. To this was added a solution of sodium sulfide (50 g) in distilled water (500 ml) and the mixture was stirred and heated at 60° C. for 30 minutes, when a pale green precipitate was formed. The suspension was cooled to room temperature and the leuco-sulfide product filtered off, washed with 4–500 ml distilled water and dried at 50° C. overnight. The yield was 7–8 g of a light green powder, insoluble in water, very soluble in acetone and in dichloromethane.

Step (ii): The leuco-sulfide (1.06 g) was dissolved in acetone (15 ml) at room temperature, and commercial lactic acid (85%; 0.49 g) was added, and stirring was continued for 30 minutes. Water (50 ml) was added and the deeply colored solution was boiled until most of the acetone had evaporated. The suspension was then cooled to room temperature and extracted with dichloromethane until most of the color had been removed from the aqueous layer. The dichloromethane extracts were dried over anhydrous magnesium sulfate, filtered, and evaporated to dryness in vacuo to give the lactate salt. The yield of the dye was 0.99 g.

The presence of the cyanine dye chromophore in the product was confirmed by visible absorption spectroscopy, when the spectrum showed a visible absorption band with identical characteristics ($\lambda_{max}$, half-bandwidth and band profile) to those of the original dye perchlorate.

A solution in dichloromethane gave a peak wavelength absorbance, $\lambda_{max}$=672 nm and an extinction coefficient, $\epsilon_{max}$=173,000 1 mol$^{-1}$cm$^{-1}$. EDX analysis showed the absence of chlorine (i.e., no residual perchlorate ion). FTIR showed a new intense peak at 1603 cm$^{-1}$ characteristic of the lactate anion.

SYNTHETIC EXAMPLE D3

A cyanine dye of formula (III) wherein $R_1$=n—$C_4H_9$, and $R_2$=n—$C_3H_7$, n=2, and X$^-$ is the ferricyanide ion (Fe(CN)$_6^{3-}$) was prepared by a second variation of the method involving formation of a leuco-sulfide derivative and reaction of this with an acid according to the following method:

METHOD IIB (Method II, second variation):

Step (i) (Formation of the chloride salt from the perchlorate salt).

The leuco-sulfide derivative of the dye (1.0 g) prepared from the perchlorate salt as described in METHOD II(a) was dissolved in dichloromethane (20 ml) and to this was added concentrated (35%) hydrochloric acid (2 ml) with stirring. After 30 minutes the dichloromethane was evaporated off and methanol (40 ml) and distilled water (75 ml) was added to dissolve the dark blue residue. The solution was neutralized with an aqueous solution of sodium carbonate, giving a deep blue solution of the chloride salt of the dye.

Step (ii) Potassium ferricyanide (5.0 g) was added to the above solution and the mixture was stirred and heated at 80° C. for 2 hours, allowing the methanol to evaporate. The suspension was cooled to room temperature and after standing for 12 hours the precipitated ferricyanide salt was filtered off, washed with distilled water (4–50 ml) and dried at 50° C. in an oven. The yield was 0.99 g.

The presence of the cyanine dye chromophore in the product was confirmed by visible absorption spectroscopy, when the spectrum showed a visible absorption band with identical characteristics ($\lambda_{max}$, half-bandwidth and band profile) to those of the original dye perchlorate. A solution in dichloromethane gave a peak wavelength absorbance, $\lambda_{max}$=672 nm and an extinction coefficient, $\epsilon_{max}$=141,000 1 mol$^{-1}$ cm$^{-1}$.

The UV spectrum showed a weak broad band at 360 nm not present in the perchlorate dye, and attributable to the ferricyanide anion.

EDX analysis showed an intense iron peak due to the ferricyanide anion.

DSC showed two sharp endotherms, at 83.9° C. and 158.9° C., in addition to other peaks.

SYNTHETIC EXAMPLE D4

A cyanine dye of formula (I) wherein $R_1$=$R_2$=$CH_3$, n=1, and X$^-$ is SCN$^-$ is prepared according to the following method. Step 1, Synthesis of the dye acetate salt.

Fischer's base (1.71 g) and Fischer's aldehyde (1.83 g) were dissolved in a mixture of glacial acetic acid (25 ml) and acetic anhydride (5 ml), and the solution was heated under reflux for 3 hours. After cooling the solution to room temperature, distilled water (250 ml) was added and stirring continued for 1 hour. The deep red solution of the acetate salt of the cyanine dye was then neutralized to pH 7 by addition of an aqueous solution of sodium carbonate (0.5 molar, ca. 650 ml).

Step 2: Formation of the thiocyanate salt.

The above solution of the dye acetate was heated at 80° C. with stirring and solid sodium thiocyanate (120 g) was added. Precipitation of the thiocyanate salt of the cyanine dye began immediately. Stirring was continued at 80° C. for 2 hours and the suspension then allowed to cool to room temperature overnight. The solid was filtered off, washed with 4–50 ml distilled water, and dried in an oven at 50° C. The yield was 3.4 g. The presence of the cyanine dye chromophore in the product was confirmed by visible absorption spectroscopy, when the spectrum showed a visible absorption band with identical characteristics ($\lambda_{max}$, half-bandwidth and band profile) to the original dye acetate. A solution in dichloromethane gave a peak wavelength absorbance, $\lambda_{max}$=546 nm and an extinction coefficient, $\epsilon_{max}$=132,100 1 $mol^{-1}$ $cm^{-1}$.

The presence of the thiocyanate anion was confirmed by the characteristic thiocyanate peak at $2053 cm^{-1}$ in the infrared spectrum. DSC analysis showed a sharp endotherm at 216.2° C.

SYNTHETIC EXAMPLE D5

Dye D5 of formula III wherein $R_1$=n—$C_4H_9$, $R_2$=n—$C_3H_7$, n=2, and X=$H_2PO_2^-$, was prepared by Method IIA, using 0.35 g of the dye sulfide in 15 ml of acetone, to which was added 5 ml of hypophosphorous acid (50 wt % in water), which after treating according to the general procedure yielded 0.30 g of the dye hypophosphite. The presence of the dye cation component was confirmed by the visible absorption band characteristics of the dye ($\lambda_{max}$, half-bandwidth and band shape), which were identical to those of the parent perchlorate dye ($\lambda_{max}$=672 nm; $\epsilon_{max}$=175,100 1 $mol^{-1}$ $cm^{-1}$ in dichloromethane). The presence of the hypophosphite anion was confirmed by EDX analysis, which showed an intense phosphorus peak and no chlorine. DSC analysis showed a sharp endotherm at 249° C.

SYNTHETIC EXAMPLE D6

Dye D6 of formula III wherein $R_1$=n—$C_4H_9$, $R_2$=n—$C_3H_7$, n=2, and X=$Ni(CN)_4^{-2}$, was prepared by Method IA, using 5.0 g of the dye perchlorate dissolved in 300 ml of methanol and 50 ml water to which was added with boiling a solution of 12 g of potassium tetracyanonickelate in 50 ml water, which after boiling for 10 minutes, cooling and addition of 200 ml water, yielded 4.8 g of the dye tetracyanonickelate upon filtration. The presence of the dye cation component was confirmed by the visible absorption band characteristics of the dye ($\lambda_{max}$, half-bandwidth and band shape), which were identical to those of the parent perchlorate dye. ($\lambda_{max}$=672 nm; $\epsilon_{max}$=206,300 1 $mol^{-1}$ $cm^{-1}$ in dichloromethane).

The presence of the tetracyanonickelate anion was confirmed by EDX which showed the presence of nickel and by the characteristic cyano peak at 2100 $cm^{-1}$ in the infrared spectrum.

SYNTHETIC EXAMPLE D7

Dye D7 of formula II wherein $R_1$=$R_2$ =n—$C_4H_9$, n=2, and X=$SCN^-$, was prepared by Method IC using 4.5 g of the dye iodide and 65 g of sodium thiocyanate dissolved in 80 ml of DMF at 60° C., which after heating for 2 hrs. and isolated in accordance with the general procedure yielded 4.03 g of the dye thiocyanate. The presence of the cyanine dye chromophore in the product was confirmed by visible absorption spectroscopy, when the spectrum showed a visible absorption band with identical characteristics ($\lambda_{max}$, half-bandwidth and band profile) to the original dye acetate. ($\lambda_{max}$=691 nm; $\epsilon_{max}$=233,800 1 $mol^{-1}$ $cm^{-1}$ in dichloromethane).

The presence of the thiocyanate anion was confirmed by the characteristic thiocyanate peak at $2055 cm^{-1}$ in the infrared spectrum.

SYNTHETIC EXAMPLE D8

Dye D8 of formula III wherein $R_1$=n—$C_4H_9$, $R_2$=n—$C_3H_7$, n=2, and X=$CF_3SO_3^-$, was prepared by Method IIA except that dichloromethane instead of acetone was used as the solvent. 1.0 g of the dye sulfide in 25 ml of dichloromethane, was added to a solution of 0.54 g of trifluoromethanesulfonic acid, which after treating according to the general procedure yielded 1.15 g of the dye trifluoromethanesulfonate. The presence of the dye cation component was confirmed by the visible absorption band characteristics of the dye ($\lambda_{max}$, half-bandwidth and band shape), which were identical to those of the parent perchlorate dye. ($\lambda_{max}$=672 nm; $\epsilon_{max}$=159,000 1 $mol^{-1}$ $cm^{-1}$ in dichloromethane.)

The presence of the trifluoromethanesulfonate anion was confirmed by EDX analysis, which showed the presence of fluorine and sulfur.

SYNTHETIC EXAMPLE D9

Dye D9 wherein $R_1$=n—$C_4H_9$, $R_2$=n—$C_3H_7$, n=2, and X=$SeCN^-$, was prepared by Method IB using 1.26 g of the dye perchlorate to which was added 2.0 g of potassium selenocyanate in 3 ml of dimethyl formamide, which after treating according to the general procedure yielded 0.30 g of the dye selenocyanate. The presence of the dye cation component was confirmed by the visible absorption band characteristics of the dye ($\lambda_{max}$, half-bandwidth and band shape), which were identical to those of the parent perchlorate dye. ($\lambda_{max}$=672 nm; $\epsilon_{max}$=125,000 1 $mol^{-1}$ $cm^{-1}$ in dichloromethane). The presence of the selenocyanate anion was confirmed by EDX, which showed an intense selenium peak.

SYNTHETIC EXAMPLE D10

Dye D10 of formula III wherein $R_1$=n—$C_4H_9$, $R_2$=n—$C_3H_7$, n=2, and X=2,4,6-$(NO_2)_3C_6H_2O^-$, was prepared by Method IA using 1.26 g of the dye perchlorate in 125 ml of a 3:1 mixture of methanol and water, to which was added a solution in 150 ml water of 5.7 g of sodium picrate, 1.5 g of sodium carbonate and 30 ml methanol. The solution was filtered after standing for 4 hours and yielded 1.49 g of the dye picrate. The presence of the dye cation component was confirmed by the general characteristics of the longest wavelength absorption band of the dye ($\lambda_{max}$, half-bandwidth and band shape), which were identical to those of the parent perchlorate dye. ($\lambda_{max}$=672 nm; $\lambda_{max}$=130,000 1 $mol^{-1}$ $cm^{-1}$ in dichloromethane). The presence of the picrate anion was confirmed by the characteristic picrate anion absorption band in the near UV region at 360 nm (not present in the original perchlorate dye).

SYNTHETIC EXAMPLE D11

Dye D11 of formula III wherein $R_1$=n—$C_4H_9$, $R_2$=n—$C_3H_7$, n=2, and X=1,2-naphthoquinone-2-diazide-5- sulfonate, was prepared by Method IB using 2.0 g of the dye perchlorate to which was added 20 gm the sodium salt of 1,2-naphthoquinone-2-diazide-5-sulfonic acid in 40 ml DMF at 60° C., which after treating according to the general procedure yielded 2.23 g of the dye 1,2-naphthoquinone-2-diazide-5-sulfonate. The presence of the dye cation component was confirmed by the visible absorption band characteristics of the dye ($\lambda_{max}$, half-bandwidth and band shape), which were identical to those of the parent perchlorate dye ($\lambda_{max}$=672 nm; $\lambda_{max}$=280,000 1 mol$^{-1}$ cm$^{-1}$ in dichloromethane). The presence of the 1,2-naphthoquinone-2-diazide-5-sulfonate anion was confirmed by the characteristic diazide peak at 2103 cm$^{-1}$ in the infrared spectrum of the salt.

SYNTHETIC EXAMPLE D12

Dye D12 of formula III wherein $R_1$=n—$C_4H_9$, $R_2$=n—$C_3H_7$, n=2, and X=HO—$CH_2CH_2CH_2CO2^-$, was prepared by Method IIA using 5.6 g of the dye sulfide in 60 ml acetone to which was added 4 g of 4-hydroxybutyric acid in 25 ml water, which after treating according to the general procedure, yield 2.65 g of the dye 4-hydroxybutyrate. The presence of the dye cation component was confirmed by the visible absorption band characteristics of the dye ($\lambda_{max}$, half-bandwidth and band shape), which were identical to those of the parent perchlorate dye. ($\lambda_{max}$=672 nm; $\epsilon_{max}$=133,000 1 mol$^{-1}$ cm$^{-1}$ in dichloromethane). The presence of the 4-hydroxybutyrate anion was confirmed by infrared spectroscopy, the salt showing a characteristic carboxylate peak at 1603 cm$^{-1}$.

SYNTHETIC EXAMPLE D13

Dye D13 of formula III wherein $R_1$=n—$C_4H_9$, $R_2$=n—$C_3H_7$, n=2, and X=$NO_2^-$, was prepared by Method IB, using 1.3 g of the dye perchlorate in 200 ml of a 1:3 mixture of methanol and water to which was added 20 gm of sodium nitrite, which after treating according to the general procedure yielded 1.18 g of the dye nitrite. The presence of the dye cation component was confirmed by the visible absorption band characteristics of the dye ($\lambda_{max}$, half-bandwidth and band shape), which were identical to those of the parent perchlorate dye. ($\lambda_{max}$=672 nm; $\epsilon_{max}$=153,000 1 mol$^{-1}$ cm$^{-1}$ in dichloromethane). The presence of the nitrite ion was confirmed by the high reactivity of the salt to the action of dilute acids, whereas other salts of the dye were stable under these conditions. EDX confirmed the absence of chlorine.

SYNTHETIC EXAMPLE D14

Dye D14 of formula III wherein $R_1$=n—$C_4H_9$, $R_2$=n—$C_3H_7$, n=2, and X=2-(3',5'-dimethyl-2'-hydroxyphenyl)-2H-benztriazole-4-sulfonate, was prepared by Method IIB using 1.0 g of the dye perchlorate to which was added a solution of 3.2 g of 2-(3',5'-dimethyl-2'-hydroxyphenyl)-2H-benztriazole-4-sulfonic acid in 150 ml of a 1:2 mixture of methanol and water, which after treating according to the general procedure yielded 0.96 g of the dye 2-(3',5'-dimethyl-2'-hydroxyphenyl)-2H-benztriazole-4-sulfonate. The presence of the dye cation component was confirmed by the visible absorption band characteristics of the dye ($\lambda_{max}$, half-bandwidth and band shape), which were identical to those of the parent perchlorate dye. ($\lambda_{max}$=672 nm; $\epsilon_{max}$=130,000 1 mol$^{-1}$ cm$^{-1}$ in dichloromethane). The presence of the benztriazole sulfonate anion was confirmed by the characteristic peaks of the anion at 310 and 349 nm in the UV spectrum of the dye.

SYNTHETIC EXAMPLE D15

Dye D15 of formula I wherein $R_1$=$R_2$=n—$C_3H_7$, n=2, and X=SCN$^-$, was prepared by Method IC using 5.0 g of the dye iodide dissolved in 80 ml DMF to which was added a solution of 50 g of sodium thiocyanate in 80 ml DMF, which after heating for 2 hrs. at 80° C. and isolated according to the general procedure yielded 4.23 g of the dye thiocyanate. The presence of the cyanine dye chromophore in the product was confirmed by visible absorption spectroscopy, when the spectrum showed a visible absorption band with identical characteristics ($\lambda_{max}$, half-bandwidth and band profile) to the original dye acetate. ($\lambda_{max}$=650 nm; $\epsilon_{max}$=244,000 1 mol$^{-1}$ cm$^{-1}$ in dichloromethane.)

The presence of the thiocyanate anion was confirmed by the characteristic thiocyanate peak at 2054 cm$^{-1}$ in the infrared spectrum.

SYNTHETIC EXAMPLE D16

Dye D16 of formula I wherein $R_1$=$R_2$=$CH_3$, n=2, and X=$CH_3CH(OH)CO_2^-$, was prepared by Method IIA, using 0.49 g of the dye iodide dissolved in 60 ml of a 3:1 mixture of methanol: water to which was added a 15 g of sodium sulfide in 50 ml water. The sulfide derivative was filtered off and dried to yield 0.42 g which was dissolved in 15 ml acetone. To this was added 0.31 g of 85% lactic acid in 60 ml water, which after treating according to the general method yielded 0.40 g of the dye lactate. The presence of the cyanine dye chromophore in the product was confirmed by visible absorption spectroscopy, when the spectrum showed a visible absorption band with identical characteristics ($\lambda_{max}$, half-bandwidth and band profile) to the original dye acetate. ($\lambda_{max}$=648 nm; $\epsilon_{max}$=150,000 1 mol$^{-1}$ cm$^{-1}$ in dichloromethane). The presence of the lactate ion was confirmed by the characteristic i.e., peak at 1603 cm$^{-1}$.

SYNTHETIC EXAMPLE D17

Dye D17 of formula I wherein $R_1$=$R_2$=$CH_3$, n=3, and X=SCN$^-$, was prepared by Method IA except that the iodide was used instead of the perchlorate. 0.80 gm of the dye iodide was dissolved in 19 ml of a 3:1 mixture of methanol:water. To this was added to 40 ml of a saturated solution of sodium thiocyanate in water, which after standing at room temperature and isolated according to the general method yielded 0.083 g of the dye thiocyanate. The presence of the cyanine dye chromophore in the product was confirmed by visible absorption spectroscopy, when the spectrum showed a visible absorption band with identical characteristics ($\lambda_{max}$, half-bandwidth and band profile) to the original dye acetate. ($\lambda_{max}$=730 nm; $\epsilon_{max}$=200,000 1 mol$^{-1}$ cm$^{-1}$ in dichloromethane).

The presence of the thiocyanate anion was confirmed by the characteristic thiocyanate peak at 2054cm$^{-1}$ in the infrared spectrum.

The structures of these Synthesis Examples and Comparison Synthesis Examples are summarized in Table 2.

TABLE 2

| DYE NO. | CATION | | | | |
|---|---|---|---|---|---|
| | Structure | R1 | R2 | n | ANION |
| D1 | III | n-$C_4H_9$ | n-$C_3H_7$ | 2 | THIOCYANATE |
| D2 | III | n-$C_4H_9$ | n-$C_3H_7$ | 2 | LACTATE |
| D3 | III | n-$C_4H_9$ | n-$C_3H_7$ | 2 | FERRICYANIDE |
| D4 | I | $CH_3$ | $CH_3$ | 1 | THIOCYANATE |
| D5 | III | n-$C_4H_9$ | n-$C_3H_7$ | 2 | HYPOPHOSPHITE |
| D6 | III | n-$C_4H_9$ | n-$C_3H_7$ | 2 | TETRACYANONICKELLATE |
| D7 | II | n-$C_4H_9$ | n-$C_4H_9$ | 2 | THIOCYANATE |

TABLE 2-continued

| DYE NO. | Structure | CATION R1 | R2 | n | ANION |
|---|---|---|---|---|---|
| D8 | III | n-$C_4H_9$ | n-$C_3H_7$ | 2 | TRIFLUOROMETHANE-SULFONATE |
| D9 | III | n-$C_4H_9$ | n-$C_3H_7$ | 2 | SELENOCYANATE |
| D10 | III | n-$C_4H_9$ | n-$C_3H_7$ | 2 | PICRATE |
| D11 | III | n-$C_4H_9$ | n-$C_3H_7$ | 2 | 1,2-NAPHTHOQUINONE-2-DIAZIDE-5-SULFONATE |
| D12 | III | n-$C_4H_9$ | n-$C_3H_7$ | 2 | 4-HYDROXY BUTYRATE |
| D13 | III | n-$C_4H_9$ | n-$C_3H_7$ | 2 | NITRITE |
| D14 | III | n-$C_4H_9$ | n-$C_3H_7$ | 2 | 2-(3',5'-DIMETHYL-2'-HYDROXYPHENYL)-2H-BENZTRIAZOLE-4-SULFONATE |
| D15 | I | n-$C_3H_7$ | n-$C_3H_7$ | 2 | THIOCYANATE |
| D16 | I | $CH_3$ | $CH_3$ | 2 | LACTATE |
| D17 | I | $CH_3$ | $CH_3$ | 3 | THIOCYANATE |
| DC1 | III | n-$C_4H_9$ | n-$C_3H_7$ | 2 | PERCHLORATE |
| DC2 | I | n-$C_3H_7$ | n-$C_3H_7$ | 2 | IODIDE |
| DC3 | II | n-$C_4H_9$ | n-$C_4H_9$ | 2 | PERCHLORATE |
| DC4 | I | $CH_3$ | $CH_3$ | 1 | PERCHLORATE |
| DC5 | I | $CH_3$ | $CH_3$ | 1 | IODIDE |

EXAMPLE 1

The solubility in ethyl lactate of dye D1 was measured as described in the following. A mixture of the dye powder and ethyl lactate solvent was prepared in an opaque glass bottle, such that the weight of the dye was equal to 25% of the total weight of dye plus solvent. The mixture was agitated by rolling on a jar roller for 16 hrs. at room temperature. After settling at room temperature for 1–2 hrs., the mixture was filtered through a syringe filter to obtain a clear filtrate. 0.5 gm of the solution thus obtained was diluted to 100 ml with ethyl lactate in a volumetric flask, and 1 ml of the resulting solution was further diluted to 100 ml. The spectroscopic absorbance of the solution was measured at the peak absorption wavelength $\lambda_{max}$ of the dye and compared with a control solution containing a known concentration of the dye.

EXAMPLES 2–17

The solubility in ethyl lactate of each of the dyes D2–D18 of Table 2 was determined by one of two methods depending on the quantity and purity of the dye sample available for testing. Method A, used in examples 2–5, 10, 11, 12, 13, and 15 is the same as that used in example 1, except that the weight of dye was equal to 12% of the total weight of dye plus solvent. In Method B, used in examples 6, 7, 9, 14, 16 and 17, 150 mgm of the dye and 1 ml of solvent were heated to 100° C. for 30 minutes, subjected to ultrasound for 5 min., held in a temperature controlled bath at 25° C. for 12 hrs. and centrifuged at 4000 rpm for 20 minutes. 200 microliters of the clear supernatant were removed and diluted to 100 ml in dichloromethane. 1 ml of the resulting solution was further diluted to 100 ml and the spectrometric absorbance measured in a 1 cm cell. The concentration in moles per liter of the dye (C) was calculated from the measured absorbance A at the peak wavelength $\lambda_{max}$, and the measured extinction coefficient $\epsilon_{max}$ at the same wavelength from the relationship $C = A/\epsilon_{max}$. The concentration was converted from moles per liter to wt % (gms of dye per hundred gms of solution) by multiplying C by the factor 0.1×molecular weight/solution density.

COMPARATIVE EXAMPLES 1–5

The dyes of DC1–DC5 selected for the comparative examples are based on cations having the same molecular structure as dyes of the invention, however, the anions are of the conventional type, either iodide or perchlorate. The solubility in ethyl lactate was determined by the method according to example 1 for the comparative examples C1–C3 and by Method B as described above for examples C4 and C5.

The results of the solubility determinations are given in Table 3. Whereas the dyes D1–D17 of the present invention having anions with enhanced solubility in ethanol show remarkably high solubility in ethyl lactate, which in most cases exceeds 12%; dyes DC1–DC5 having conventional iodide or perchlorate anions, exhibit solubilities below 6% by weight in ethyl lactate.

TABLE 3

| Example | Dye No. | Ethyl Lactate Solubility (%) |
|---|---|---|
| 1 | D1 | 18% |
| 2 | D2 | >12% |
| 3 | D3 | >12% |
| 4 | D4 | >12% |
| 5 | D5 | >12% |
| 6 | D6 | >15% |
| 7 | D7 | 17% |
| 8 | D8 | >12 |
| 9 | D9 | 17% |
| 10 | D10 | >12% |
| 11 | D11 | 16% |
| 12 | D12 | >12% |
| 13 | D13 | 19% |
| 14 | D14 | 12% |
| 15 | D15 | >12% |
| 16 | D16 | 19% |
| 17 | D17 | 21% |
| C1 | DC1 | 6% |
| C2 | DC2 | <6% |
| C3 | DC3 | 5% |
| C4 | DC4 | <4% |
| C5 | DC5 | <6% |

EXAMPLE 18

The solution stability upon temperature cycling of a sample of the dye solution in ethyl lactate obtained as the filtrate from a solution of Dye D1 prepared in accordance with the method of Example 1, was determined as described in the following. 10 ml of the solution was transferred to a clear glass bottle in a refrigerator at a temperature of 5° C. for 16 hrs.; removed from the refrigerator and maintained at room temperature for 8 hrs., after which time the bottle was tilted gently so that the formation of any precipitated solid material on the bottom of the bottle could be observed. This process was repeated for up to 10 days after which time no precipitate was observed to form.

COMPARATIVE EXAMPLE 6

The method according to Example 18 was repeated except that the dye was DC1, having the same cation as Dye D1, but a perchlorate instead of a thiocyanate anion. Examination of the solution after a single refrigeration-room temperature exposure cycle revealed the presence of a crystalline precipitate showing the solution to be unstable after temperature cycling.

The results of Example 18 and Comparative Example 6 show that a concentrated solution of dye D1 of the present invention having a thiocyanate anion exhibits excellent stability in ethyl lactate upon temperature cycling, whereas a concentrated solution of dye DC1, having a perchlorate anion but the same cation as Dye D1, produces a crystalline precipitate upon temperature cycling, showing the solution to be unstable.

EXAMPLE 19

A mixture of the dye powder D1 and ethyl lactate solvent was prepared, such that the weight of the dye was equal to 15% of the total weight of dye plus solvent and subjected to strong agitation for five minutes by means of an ultrasonic processor model DG-100 manufactured by Telsonics. After settling at room temperature for 1–2 hrs., the mixture was filtered through a syringe filter to obtain a clear filtrate. The sample was allowed to stand at room temperature. Upon careful examination it was found that no precipitate had formed, even after storage in the dark for 30 days.

EXAMPLE 20

The method according to Example 19 was repeated except that the dye sample was Dye D2 It was found that no precipitate had formed, even after storage in the dark for 30 days.

EXAMPLE 21

The method according to Example 19 was repeated except that the dye sample was Dye D15. It was found that no precipitate had formed even after storage in the dark for 30 days.

COMPARATIVE EXAMPLE 7

The method according to Example 19 was repeated except that the dye was DC1 having the same cation as Dye D1, but a perchlorate instead of a thiocyanate anion. Examination of the solution after standing over one night revealed the presence of a crystalline precipitate showing the solution to be unstable on storage after dissolution by ultrasonic agitation.

COMPARATIVE EXAMPLE 8

The method according to Example 19 was repeated except that the dye was DC2 having the same cation as Dye D15, but an iodide instead of a thiocyanate anion. Examination of the solution after standing over one night revealed the presence of a crystalline precipitate showing the solution to be unstable on storage after dissolution by ultrasonic agitation.

The results of the solution stability measurements of Examples 19–21 and Comparative Examples 7 and 8 show that dyes of the present invention having enhanced solubility in ethyl lactate do not recrystallize or produce an undesirable precipitate upon storage, whereas dyes DC1–DC5 having conventional iodide or perchlorate anions, exhibit poor solution stability and produce crystalline precipitates upon storage or temperature cycling.

EXAMPLE 22

A mixture of 7.65% by weight of the cyanine dye D1 and 1.35% of an aminium stabilizing dye of formula (VIII), and 90 wt % of ethyl lactate was prepared in an opaque bottle. The mixture was dissolved by rolling on a jar roller for 16 hrs. at room temperature.

0.5 gm of the solution thus obtained was diluted to 100 ml with ethyl lactate in a volumetric flask, and 1 ml of the resulting solution was further diluted to 100 ml. The spectroscopic absorbance of the solution was measured at the peak absorption wavelength $\lambda_{max}$ of the dye and compared with a control solution containing a known concentration of the dye. The sample was stored at room temperature and the absorbance of the solution measured approximately once every 10 days for up to 60 days. The percentage reduction in absorbance of the dye D1 at 4 was found to be only 1.6% after 60 days, thus showing the dye to exhibit excellent chemical stability as a solution in ethyl lactate.

COMPARATIVE EXAMPLE 9

The method according to Example 22 was repeated except that the dye was DC1 and solvent was diacetone alcohol. The percentage reduction in absorbance of the dye DC1 at $\lambda_{max}$ was found to be 7% after 60 days.

The results of Example 22 and Comparative Example 9 show that a solution in ethyl lactate of a dye D1 of the present invention having a thiocyanate anion is more stable against chemical decomposition on storage than a solution in diacetone alcohol of a dye DC1 having the same cation as dye D1 but a perchlorate anion.

EXAMPLE 23

The method according to Example 1 was repeated except that the solvent was butyl lactate instead of ethyl lactate. The room temperature solubility of dye D1 in butyl lactate was found to be 6.4%.

COMPARATIVE EXAMPLE 10

The method according to Example 23 was repeated except that the dye was DC1. Even after increasing the proportion of butyl lactate solvent such that the solids content was less than 6%, the sample formed a cake and remained substantially insoluble.

EXAMPLE 24

Mixtures of 7.6% by weight of the cyanine dye D1 and 0.7% of an aminium stabilizing dye of formula (VIII), 0.7% of nickel dibutyldithiocarbamate and 90 wt % of ethyl lactate were dissolved by rolling on a jar roller for 16 hrs. at room temperature. The resulting solution was filtered through 0.2 $\mu$m supor filter, and coated using a spin-coater onto a pre-grooved polycarbonate substrate in which the groove depth was 220 nm and the width 0.6 microns, to form a uniform dye layer of average thickness 90 nm. The dye layer was heated at 40° C. for 20 minutes and a light reflecting layer comprising a gold film of 60 nm thickness was formed on the dye layer by vacuum deposition in a sputtering chamber. A protective layer comprising a photopolymer lacquer was deposited by spin coating onto the gold layer and cured by means of ultra-violet radiation. The fabricated sample disc was tested using an APEX CD-R Tester to measure the laser recording power and recording/reproduction characteristics in accordance with the standard procedures described in the Philips-Sony Orange Book part 2. The recording power was 14 mW at 4× speed and the recording characteristics met the Orange Book Specifications.

EXAMPLE 25

Mixtures of 6.4% by weight of the cyanine dye D1 and 2.1% of an aminium stabilizing dye of formula (VIII), and 91.5 wt % of ethyl lactate solvent were dissolved in a 17 ml glass sample tube by agitating the solution using a Telsonics 100 watt ultrasonic processor for 3–5 minutes depending on the volume. The resulting solution was filtered through a 0.2 $\mu$m supor filter, and coated using a spin-coater onto a pre-grooved polycarbonate substrate.

Samples cut from the dye-coated polycarbonate disc were placed in a light exposure unit comprising two closely spaced fluorescent tubes, having a spectrum with enhanced emission in the spectral range 550–750 nm. The samples were held in close proximity to the tubes and received an exposure if about 10000 lux intensity for a period of 48 hrs. The optical density at the peak wavelength of the dye absorption band was measured before and after exposure, and the percentage reduction, which measures the photostability of the dye layer was found to be 9%.

COMPARATIVE EXAMPLE 12

The method according to Example 25 was repeated except that the cyanine dye was dye DC1 and the solvent was DAA. The resulting change in absorbance after 48 hrs. of exposure was found to be 9%.

EXAMPLE 26

The method according to Example 25 was repeated except that the cyanine dye was dye D6. The resulting change in absorbance after 48 hrs. of exposure was found to be 12%.

EXAMPLE 27

The method according to Example 25 was repeated except that the cyanine dye was dye D11 which was present in amount 6.6 wt % and an aminium stabilizing dye of formula (VII) wherein both $R_3$ are butyl, was present in an amount 1.4 wt % and the solvent was 100% diacetone alcohol. The resulting change in absorbance after 48 hrs. of exposure was found to be 8%.

EXAMPLE 28

The method according to Example 27 was repeated except that the cyanine dye was dye D10. The resulting change in absorbance after 48 hrs. of exposure was found to be 7%.

EXAMPLE 29

The method according to Example 25 was repeated except that the dye mixture comprised 5.5% by weight of Dye D4 and 1.5 wt % of the aminium stabilizing dye of formula (VIII). The resulting change in absorbance after 48 hrs. of exposure was found to be 15%.

EXAMPLE 30

The method according to Example 29 was repeated except the solvent was diacetone alcohol. The resulting change in absorbance after 48 hrs. of exposure was found to be 15%.

EXAMPLE 31

The method according to Example 25 was repeated except the cyanine dye was D14. The resulting change in absorbance after 48 hrs. of exposure was found to be 11%.

The results of examples 25–31 show that preferred dyes of the present invention in combination with aminium stabilizing dyes, when formulated in spin coating solutions using as solvents ethyl lactate and diacetone alcohol, exhibit excellent photostability, which is of a similar magnitude to the comparative Dye DC1 which has been widely used for the production of 4× CD Recordable discs.

While the invention has been described above with reference to specific embodiments thereof, it is apparent that many changes, modifications, and variations can be made without departing from the inventive concept disclosed herein. Accordingly, it is intended to embrace all such changes, modifications, and variations that fall within the spirit and broad scope of the appended claims. All patent applications, patents, and other publications cited herein are incorporated by reference in their entirety.

What is claimed is:

1. A dye composition useful for an optical information recording layer suitable for carrying out recording and readout with a laser beam, comprising at least one compound having a cyanine dye cation and a counteranion selected from the group consisting of thiocyanate, lactate, hypophosphite, tetracyanonickelate, selenocyanate, ferricyanide, 4-hydroxybutyrate, nitrite, 2-(3',5'-dimethyl-2'-hydroxyphenyl)-2H-benztriazole-4-sulfonate, 1,2-napthoquinone-2-diazide-5-sulfonate and picrate.

2. The dye composition of claim 1 further comprising a aminium dye.

3. The dye composition of claim 2, wherein said aminium dye of formula (VII):

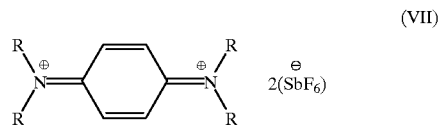

where R=

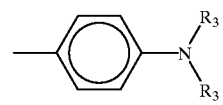

wherein each $R_3$ is a lower alkyl having 3–5 carbon atoms.

4. The dye composition of claim 2, wherein said aminium dye has formula (VIII):

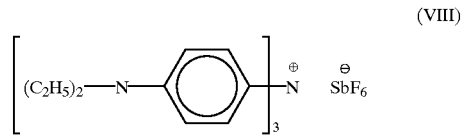

5. The dye composition of claim 2, wherein said compound is present in said dye composition in an amount from about 60% to about 90% by weight, based on the total weight of the solid components in said dye composition.

6. The dye composition of claim 2, wherein said aminium dye is present in said composition in the amount of about 5% to about 40% by weight, based on the total weight of the solid components in said dye composition.

7. The dye composition of claim 1, further comprising a nickel stabilizer, the amount of said nickel stabilizer present in an amount from about 1% to about 25% by weight of the solid components in said dye composition.

8. The dye composition of claim 7, wherein said nickel stabilizer is nickel dibutyl dithiocarbamate.

9. The dye composition of claim 1, wherein said cyanine dye is asymmetrical.

10. The dye composition of claim 1 wherein said dye composition is dissolved in a solvent and said solvent is ethyl lactate.

11. The dye composition of claim 1, wherein said compound has formula (IV):

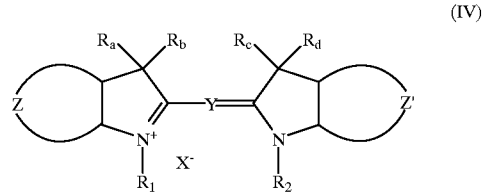

wherein $R_1$ and $R_2$ are individually selected from lower alkyl groups having 1 to 5 carbon atoms, Z and Z' are individually selected from radicals capable of forming a substituted or unsubstituted aromatic moieties; Y represents a polymethine bridge having an odd number of CH units; and $R_a$, $R_b$, $R_c$ and $R_d$ are individually selected from alkyl groups having 1 to 4 carbon atoms; and wherein $X^-$ is a counterion as defined in claim 1.

12. The dye composition of claim 11 wherein said compound has formula (I):

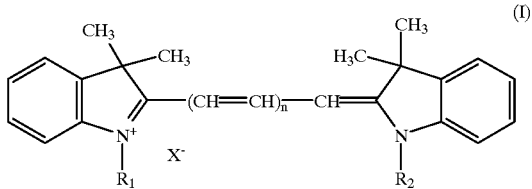

(I)

wherein $R_1$ and $R_2$ are individually selected from lower alkyl groups having 1–4 carbon atoms; n is equal to 1–3; and $X^-$ is a counterion selected from the group consisting of thiocyanate, lactate, tetracyanonickelate, ferricyanide and 2-(3',5'-dimethyl-2'-hydroxyphenyl)-2H-benztriazole-4-sulfonate.

13. The dye composition of claim 11 wherein said compound has formula (II):

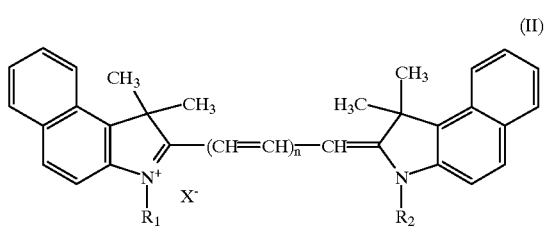

(II)

wherein $R_1$ and $R_2$ are individually selected from lower alkyl groups having 1–5 carbon atoms; n is equal to 1–3; and $X^-$ is a counterion selected from the group consisting of thiocyanate, lactate, tetracyanonickelate, ferricyanide and 2-(3',5'-dimethyl-2'-hydroxyphenyl)-2H-benztriazole-4-sulfonate.

14. The dye composition of claim 11 wherein said compound has formula (III):

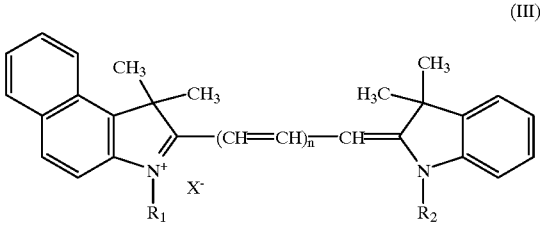

(III)

wherein $R_1$ and $R_2$ are individually selected from lower alkyl groups having 1–5 carbon atoms; n is equal to 1–3; and $X^-$ is a counterion selected from the group consisting of thiocyanate, lactate, tetracyanonickelate, ferricyanide and 2-(3',5'-dimethyl-2'-hydroxyphenyl)-2H-benztriazole-4-sulfonate.

15. The dye composition of claim 11 wherein said first cyanine dye includes an anion selected from the group consisting of thiocyanate, lactate, tetracyanonickelate, ferricyanide and 2-(3',5'-dimethyl-2'-hydroxyphenyl)-2H-benztriazole-4-sulfonate.

16. A recordable medium, comprising:
   (a) a protective layer;
   (b) a reflective layer in proximity to said protective layer;
   (c) a recording layer in proximity to said reflective layer and forming an optical interface with said reflective layer, said recording layer comprising a dye composition of claim 1; and
   (d) a transparent substrate on which said recording layer is formed.

17. A recording system, comprising the recordable medium of claim 16.

18. A dye composition useful for an optical information recording layer comprising at least one cyanine dye dissolved in ethyl lactate.

* * * * *